United States Patent [19]

Imura et al.

[11] 4,384,342
[45] May 17, 1983

[54] SYSTEM FOR REDUCING ACCESS TIME TO PLURAL MEMORY MODULES USING FIVE PRESENT-FETCH AND ONE PREFETCH ADDRESS REGISTERS

[75] Inventors: Takao Imura, Yamato; Shigeru Koyanagi; Yoshihiro Joda, both of Yokohama, all of Japan

[73] Assignee: Panafacom Limited, Yamato, Japan

[21] Appl. No.: 201,396

[22] PCT Filed: Mar. 28, 1980

[86] PCT No.: PCT/JP80/00054
§ 371 Date: Nov. 30, 1980
§ 102(e) Date: Oct. 29, 1980

[87] PCT Pub. No.: WO80/02206
PCT Pub. Date: Oct. 16, 1980

[30] Foreign Application Priority Data

Mar. 30, 1979 [JP] Japan ............... 54-37885

[51] Int. Cl.³ .................. G06F 9/38; G06F 13/00
[52] U.S. Cl. .................. 364/900; 365/230
[58] Field of Search ... 364/200 MS File, 900 MS File; 365/230, 235, 241

[56] References Cited

U.S. PATENT DOCUMENTS

| | | | |
|---|---|---|---|
| 4,156,290 | 5/1979 | Lanza | 365/230 |
| 4,156,905 | 5/1979 | Fassbender | 364/90 |
| 4,296,467 | 10/1981 | Nibby, Jr. et al. | 364/200 |
| 4,303,993 | 12/1981 | Panepinto, Jr. et al. | 365/230 |
| 4,323,965 | 4/1982 | Johnson et al. | 364/200 |
| 4,344,131 | 8/1982 | Girard | 364/200 |

Primary Examiner—James D. Thomas
Assistant Examiner—Archie E. Williams
Attorney, Agent, or Firm—Staas & Halsey

[57] ABSTRACT

A lookahead (guessahead) prefetching technique is used to reduce the average access time, for accessing memory modules when program addresses are modified into effective addresses for addressing the modules. A first memory address register stores the column address and module designation portions of the current effective address, a second memory address register stores the row address portion of the current effective address, and a third memory address register stores the module designation portion of the prior effective address. Since the same module is frequently accessed many times in succession, the average access time is reduced by starting an access based upon the contents of the second and third memory address registers without waiting until the column address and module designation portions of the current effective address are available for storage in the first memory address register. The access is completed, after the column address and module designation portions of the current effective address are determined, if a comparator which is connected to the first and third memory address registers confirms that the same memory module is being successively accessed. If not, the modules are accessed again based upon the contents of the first and second memory address modules.

4 Claims, 8 Drawing Figures

SYSTEM FOR REDUCING ACCESS TIME TO PLURAL MEMORY MODULES USING FIVE PRESENT-FETCH AND ONE PREFETCH ADDRESS REGISTERS

DESCRIPTION

BACKGROUND OF THE INVENTION

The present invention relates to a system for accessing memory modules and, more particularly, to a system for accessing memory modules by using an effective address which is composed of two or more parts, one of which is determined later than the others.

In general, in computer systems, address modification, which changes an address written in a program to an effective address which is actually used for accessing memory modules, has been known and carried out. The address modification is effected by means of a modifier, such as an address mapper or an address modification table. In a small scale computer system, such as a microcomputer system, the number of bits of an effective address is larger than that of an address written in a program. Contrary to this, in a large scale computer system, the number of bits of an effective address is smaller than that of an address written in a program. In any computer system, the lower order bits of an address written in a program serve as a part of an effective address without modification, while the other higher order bits of the address written in the program are changed to the other part of the effective address by a modifier. Therefore, one part of the effective address is determined later than the other part thereof.

In one prior art system for accessing memory modules by using an effective address, one part of which is determined later than the other part thereof, after the entire effective address is determined, the access operation for the memory modules is actually executed. Therefore, the total access time is composed of an address modification time and the actual access time, which means that the speed of access of the memory modules is low.

SUMMARY OF THE INVENTION

It is a principal object of the present invention to provide a system for accessing memory modules by using an effective address, one part of which is determined later than the other part thereof, with high speed access.

According to the present invention, the average time for accessing memory modules can be reduced by relying on the fact that successive access operations are very frequently executed on the same memory module. Because of this it is advantageous to begin an access operation when the row address portion of an effective address is available, without waiting until the column address and module designation portions of the effective address have been determined. This can be accomplished by providing a first memory address register for storing the column address and module designation portions of the current effective address, a second memory address register for storing the row address portion of the current effective address, and a third memory address register for storing the module designation portion of the prior effective address. The access operation is begun using the module designation portion of the prior effective address, which is stored in the third memory address register, and the row address portion of the current effective address, which is stored in the second memory address register. After the module designation and column address portions of the current effective address are available, a comparator circuit which is connected to the first and third memory address registers determines whether the current and prior effective addresses designate the same memory module. Assuming that the same module is designated, the access operation is completed using the column address portion of the current effective address. In the event that the designated modules are different, however, the modules are accessed again using the module designation, row address, and column address portions of the current effective address. Since the current and previous module designations are very frequently identical, the net result is that the average access time does not reflect the actual address modification time needed for transforming a program address into an effective address.

The present invention will be more clearly understood from the following description with reference to the accompanying drawings.

BRIEF DESCRIPTION OF THE DRAWINGS

FIGS. 3(1) through 3(6) are timing diagrams showing the signals appearing in the circuits of FIGS. 1 and 2;

FIGS. 7(1) through 7(9) are timing diagrams showing the signals appearing in the circuits of FIGS. 4, 5 and 6; and FIGS. 8(1) through 8(7) are block diagrams of the memory address registers 41-1, 41-2 and 41-3, for explaining the operation of the circuits of FIGS. 4, 5 and 6.

DESCRIPTION OF THE PREFERRED EMBODIMENT

Figures 1, 1A:
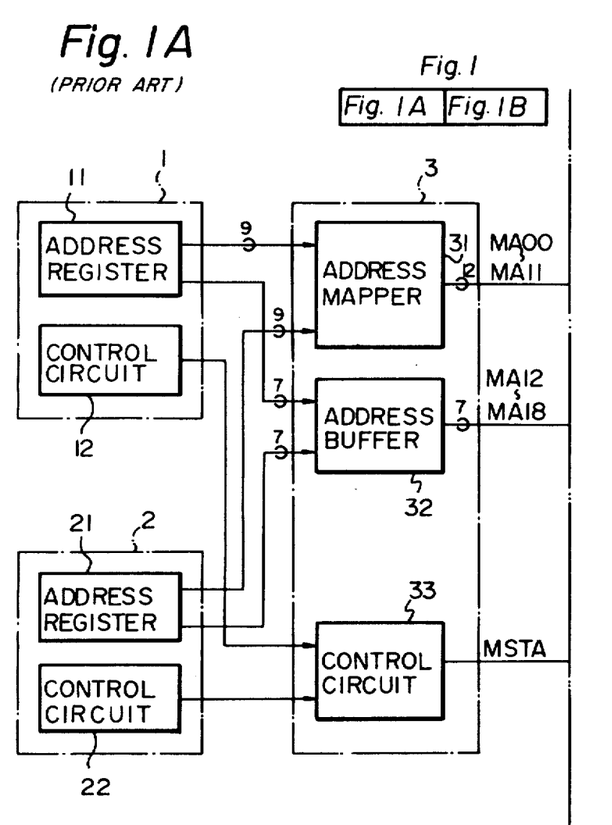
FIG. 1 is a block diagram illustrating the system for accessing memory modules of the prior art.
Figure 1B:
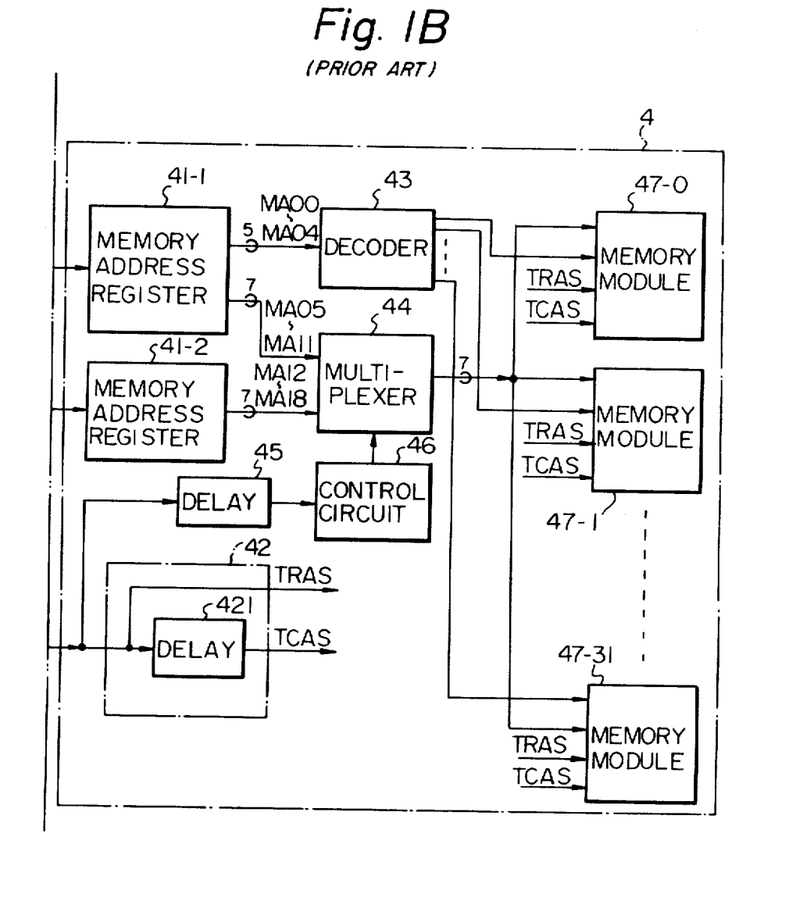

In FIG. 1, a central processing unit (hereinafter referred to as a CPU) 1 and a channel control unit (hereinafter referred to as a CHC) 2 serve as access sources for a memory unit 4 through a memory access control unit (hereinafter referred to as a MAC) 3. First, an address code of sixteen bits is transmitted from an address register 11 or 21 of the CPU 1 or CHC 2 of the MAC 3. In this case, the lower order seven bits of the address code are supplied to an address buffer 32 of the MAC 3 which produces seven signals MA12 through MA18, as indicated shown in FIG. 3(2), without modification, while the higher order nine bits of the address code are supplied to an address mapper 31 of the MAC 3, which produces twelve signals MA00 through MA11, as indicated in FIG. 3(1). In FIG. 3(1), T1 is the time which is necessary for modifying nine bits of the address code to the twelve signals MA00 through MA11. At time $t_0$, the signals MA12 through MA18 are supplied to a memory address register (hereinafter referred to as a MAR) 41-2 of the memory unit 4 and, after that, at time $t_1$, the signals MA00 through MA11 are supplied to a MAR 41-1. At the same time, a memory starting signal MSTA is supplied from a control circuit 33 of the MAC 3, which is also controlled by a control circuit 12 or 22 of the CPU 1 or CHC 2, to a control circuit 42 of the memory unit 4, as indicated in FIG. 3(3). The five signals MA00 through MA04 are supplied to a decoder 43 for selecting one module from thirty-two memory modules 47-0 through 47-31. On the other hand, the seven signals MA12 through MA18 are transmitted from the MAR 41-2 to the selected memory module and, after that, at time $t_2$, the seven signals MA05 through MA11 are transmitted from the MAR 41-1 to the selected memory module, as indicated in FIG. 3(4). Such time divisional transmission is effected by a multiplexer 44 which is controlled by a control circuit 46, which receives the control signal MSTA through a delay circuit 45 whose delay time is T2, and each of the memory modules 47-0 through 47-31 has address input pins common for the signals MA05 through MA11 and the signals MA12 through MA18. It should be noted that the address mapper 31 comprises a random access memory (RAM) from which is read out data of twelve bits by using an address code of nine bits.

Figure 2:
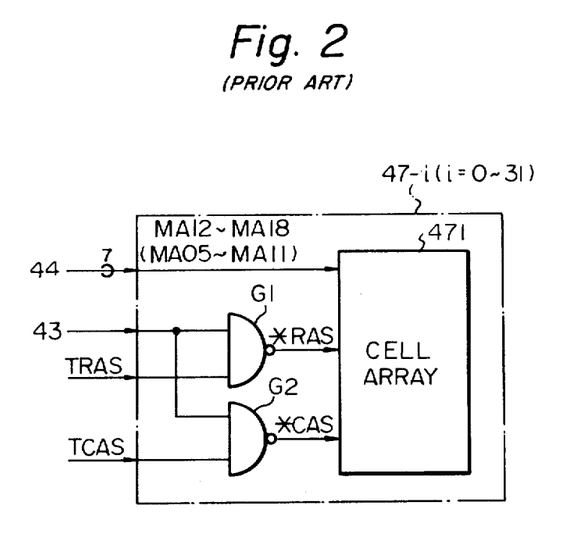
FIG. 2 is a block diagram of the memory module 47-i (i=0 through 31) of FIG. 1.

FIG. 2 is a block diagram of the memory module 47-i (i=0 through 31) of FIG. 1. In the memory module, two control signals TRAS and TCAS are supplied from the control circuit 42 (FIG. 1). In other words, the control signal TRAS is the same as the control signal MSTA, while the control signal TCAS is obtained by delaying the control signal MSTA. The delay time T3 (FIG. 3) is determined by a delay circuit 421. In the selected memory module, the potential of a control signal from the decoder 43 is high, so that a row access signal *RAS is the same as a control signal $\overline{TRAS}$ (the signal TRAS inverted) through a gate G1 as indicated in FIG. 3(5) and a column access signal *CAS is the same as a control signal $\overline{TCAS}$ (the signal TCAS inverted) through a gate G2 as indicated in FIG. 3(6). As a result, the signals MA12 through MA18 are applied to a cell array 471 in syncronization with the control signal *RAS and, after that, the signals MA05 through MA11 are applied to the cell array 471 in syncronization with the control signal *CAS.

Figure 3:
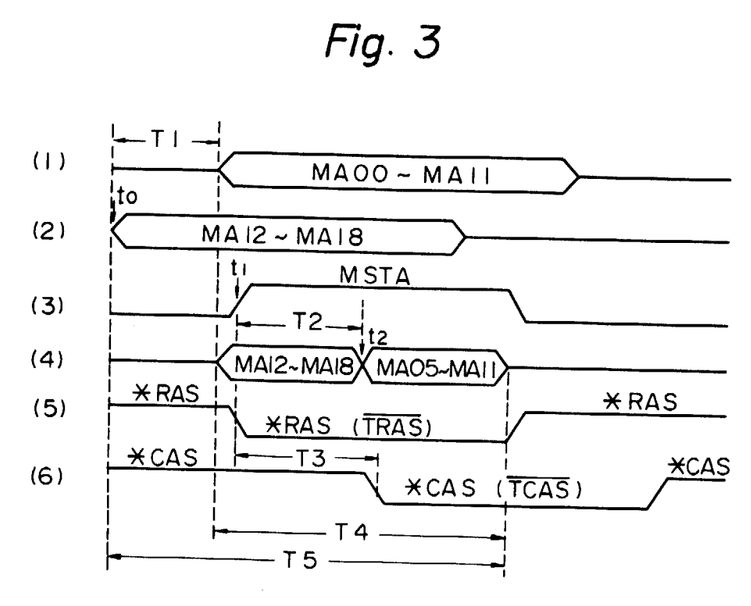

However, in the system of FIGS. 1 and 2, the total access time T5 (FIG. 3) is determined by the sum of the modification time T1 and the actual access time T4, which means that the access speed is low.

Figures 4, 4A:
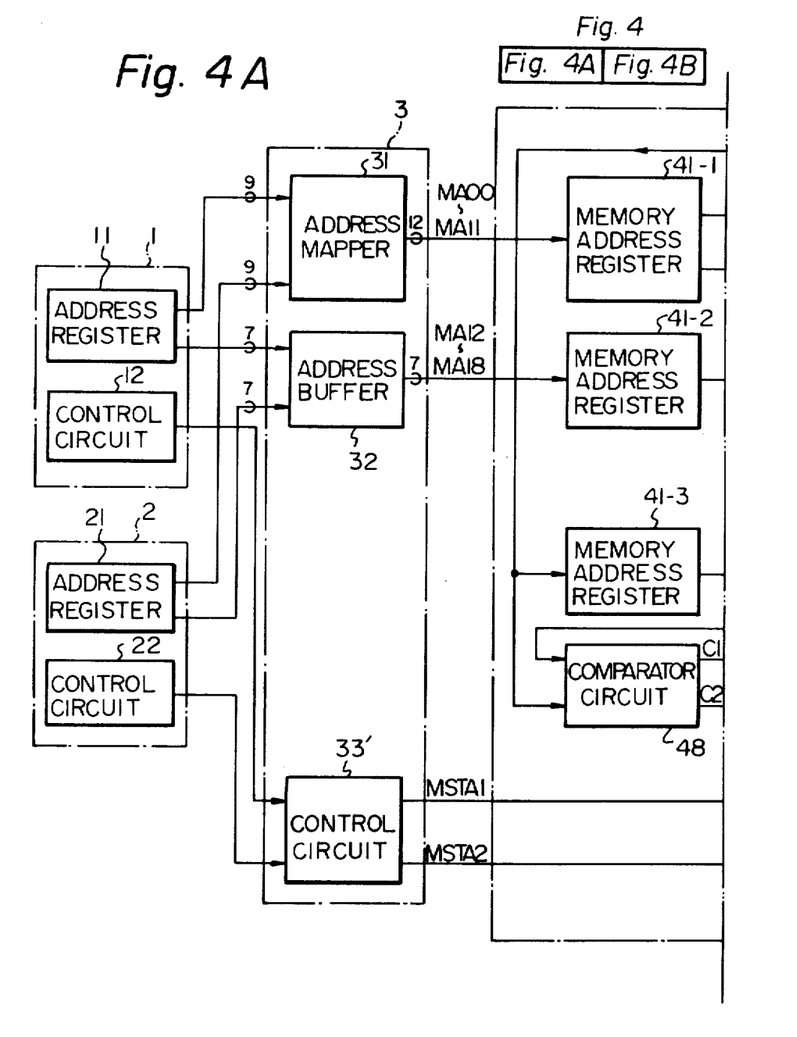
FIG. 4 is a block diagram illustrating an embodiment of the system for accessing memory modules of the present invention.
Figure 4B:
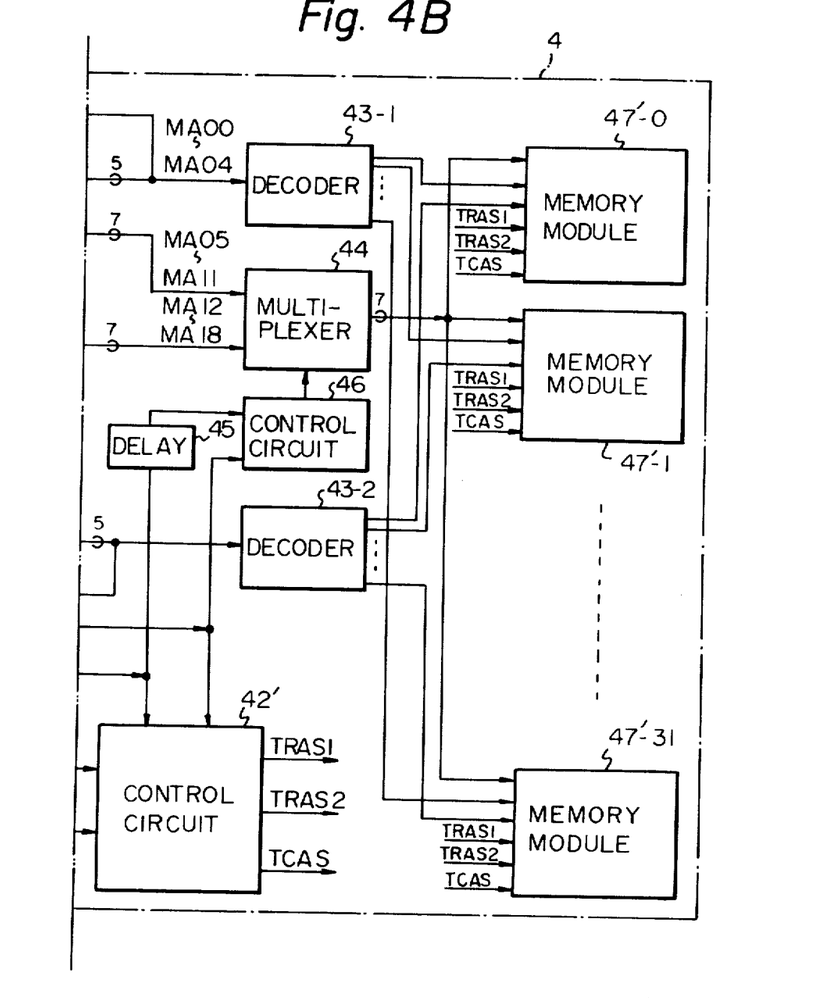

FIG. 4 is a block diagram illustrating an embodiment of the system for accessing memory modules of the present invention. The elements illustrated in FIG. 4 which are identical to those of FIG. 1 are denoted by the same reference numerals. In FIG. 4, the control circuit 33' of the MAC 3 produces two kinds of memory starting signals MSTA1 and MSTA2. The memory unit 4 comprises three MARs 41-1, 41-2 and 41-3, two decoders 43-1 and 43-2, and a comparator circuit 48. In addition, the control circuit 42' of the memory unit 4 produces three kinds of control signals TRAS1, TRAS2 and TCAS. The control circuit 42' will now be explained in more detail.

Figure 5:
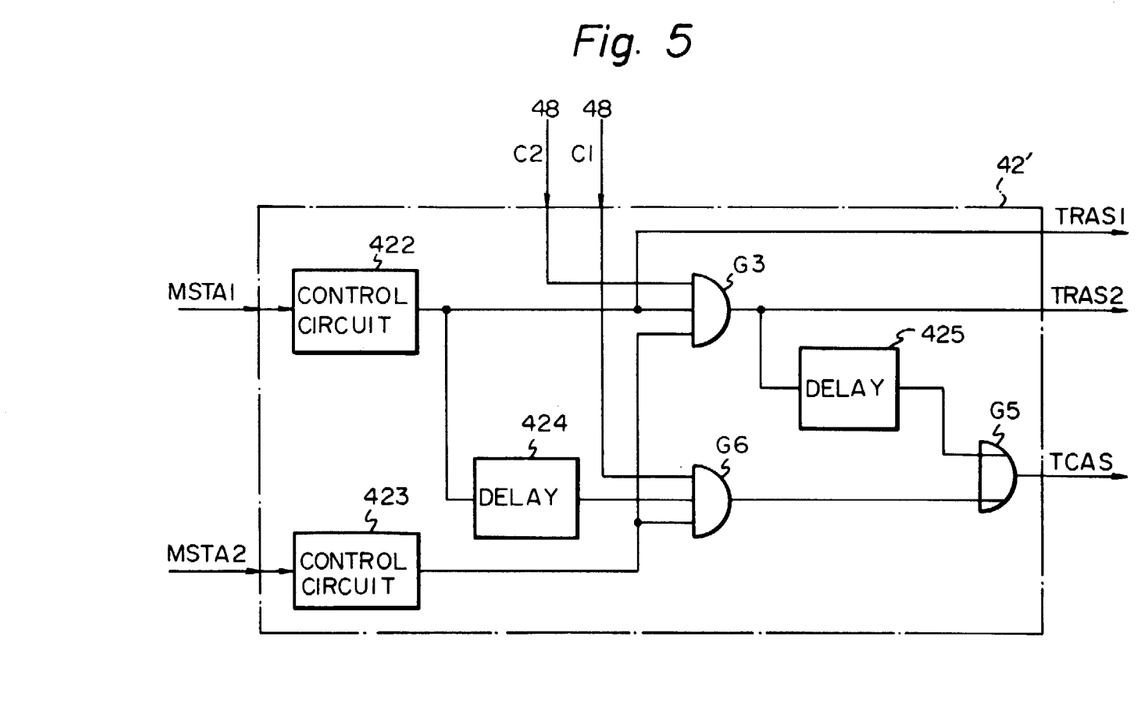
FIG. 5 is a block diagram of the control circuit 42' of FIG. 4.

FIG. 5 is a block diagram of the control circuit 42' of FIG. 4. In FIG. 5, the control circuit 42' comprises two control circuits 422 and 423 used mainly for refreshing dynamic memories, such as memory modules 47'-0 through 47'-31, two gates G3 and G4 controlled by the comparator circuit 48 (FIG. 4), two delay circuits 424 and 425 whose delay time is T3 and a gate G5. Assume that the potentials of two signals C1 and C2 are low, so that the gates G3 and G4 are closed. When the potential of the signal MSTA1 becomes high, the signal TRAS1 also becomes high. After that, when the potential of the control signal MSTA2 becomes high, the comparator circuit 48 (FIG. 4) begins to operate, so that the comparator circuit 48 raises either the potential of the signal C1 or the potential of the signal C2. For example, when the potential of the signal C1 becomes high, the potential of the signal TCAS becomes high. In this case, the signal TCAS is obtained by delaying the signal TRAS1 due to the presence of the delay circuit 424, whose delay time is T3. Contrary to this, when the potential of the signal C2 becomes high, the potential of the signal TRAS2 becomes high and, after that, the potential of the signal TCAS becomes high. In this case, the signal TCAS is obtained by delaying the signal TRAS2 due to the presence of the delay circuit 425, whose delay time is also T3. In summary, when the potential of the signal C1 is changed from low to high, the pontentials of the signals TRAS1 and TCAS become high, sequentially. Contrary to this, when the potential of the signal C2 is changed from low to high, the potentials of the signals TRAS1, TRAS2 and TCAS become high, sequentially.

Figure 6:
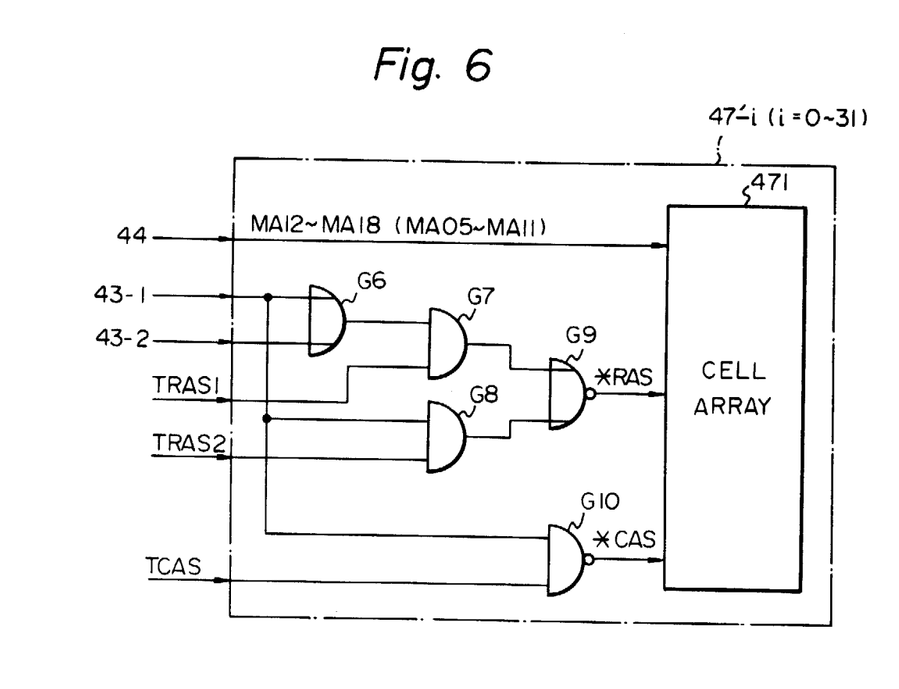
FIG. 6 is a block diagram of the memory module 47'-i (i=0 through 31) of FIG. 4.
Figure 7:
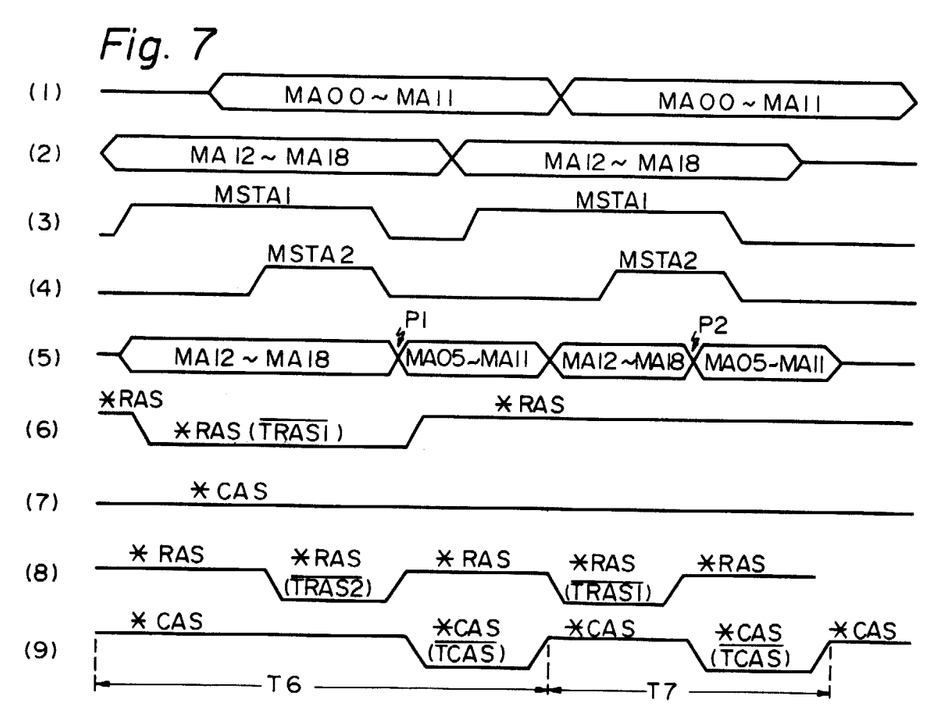
Figure 8:
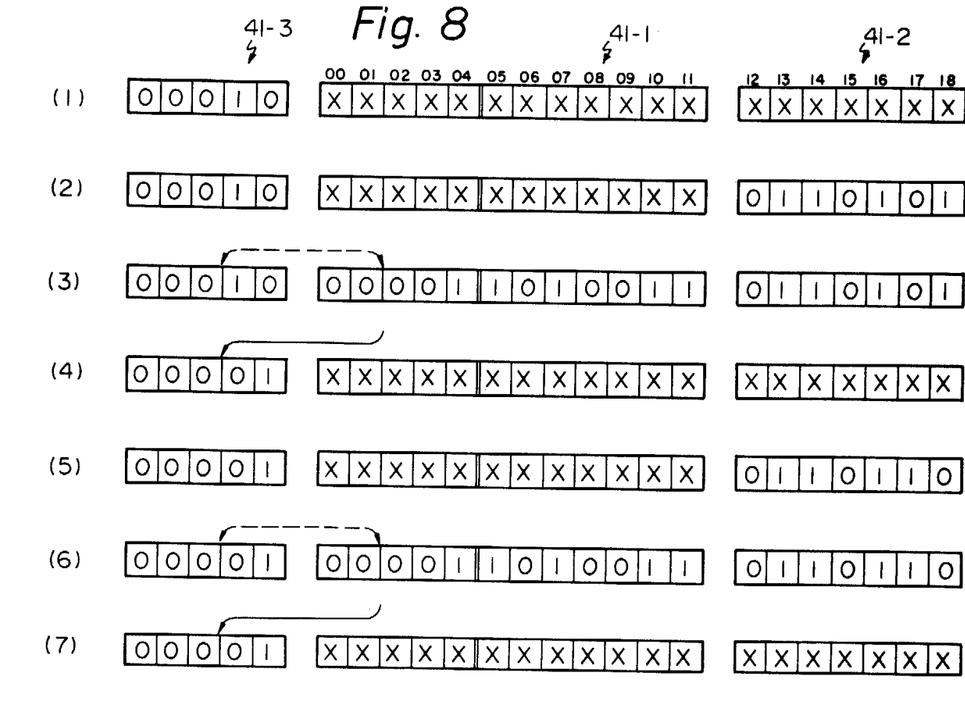

FIG. 6 is a block diagram of the memory module 47'-i (i=0 through 31) of FIG. 4. The memory module 47'-i comprises a gate G6 for receiving signals from the decoders 43-1 and 43-2 (FIG. 4), two gates G7 and G8 for passing the signals TRAS1 and TRAS2, respectively, a gate G9 for generating a signal *RAS to a cell array 471 and a gate G10 for passing the signal TCAS. For example, when the memory module 47'-i is selected by the decoder 43-2 but not by the decoder 43-1, the signal TRAS1 passes through the gates G7 and G9, so that the signal *RAS is the same as $\overline{TRAS1}$ (the signal TRAS1 inverted). After that, if the memory module 47'-i is not selected by the decoder 43-1, the signal TCAS is blocked by the gate G10. However, if the memory module 47'-i is selected by the decoder "43-1, the signal TCAS passes through the gate G10, so that the signal *CAS is the same as an inverted signal of the signal TCAS. Contrary to this, when the memory module 47'-i is selected by the decoder 43-1, the signal TRAS2 passes through the gates G8 and G9, so that the signal *RAS is the same as $\overline{TRAS2}$ (the signal TRAS2 inverted). After that, the signal TCAS passes through the gate G10, so that the signal *CAS is the same as $\overline{TCAS}$ (the signal TCAS inverted). The operation of the circuits of FIGS. 4, 5 and 6 will now be explained.

FIGS. 7(1) through 7(9) are timing diagrams indicating the signals appearing in the circuits of FIGS. 4, 5 and 6. In more detail, these figures are as follows.

FIG. 7(1) indicates the signals MA00 through MA11, which are from the address mapper 31;

FIG. 7(2) indicates the signals MA12 through MA18, which are from the address buffer 32;

FIGS. 7(3) and 7(4) indicate the memory starting signals MSTA1 and MSTA2, respectively, which are from the control circuit 33';

FIG. 7(5) indicates the signals that are from the multiplexer 44;

FIGS. 7(6) and 7(7) indicate the signals *RAS and *CAS in the memory module 47'-2, and;

FIGS. 7(8) and 7(9) indicate the signals *RAS and *CAS in the memory module 47'-1.

FIGS. 8(1) through 8(7) are block diagrams of the memory address registers 41-1, 41-2 and 41-3, for explaining the operation of the circuits of FIGS. 4, 5 and 6. Referring to FIGS. 7(1) through 7(9) and FIGS. 8(1)

through 8(7), the operations of the circuits of FIGS. 4, 5 and 6 are as follows.

(1) As indicated in FIG. 8(1), the higher order five bits (00010) of an address code used in a previous access have been transmitted from the MAR 41-1 to the MAR 41-3.

(2) As indicated in FIGS. 7(2), 7(3) and 8(2), the signals MA12 through MA18 (0110101) are transmitted from the address buffer 32 of the MAC 3 to the MAR 41-2 of the memory unit 4 and, simultaneously, the signal MSTA1 is transmitted from the control circuit 33' of the MAC 3 to the control circuit 42' of the memory unit 4. As a result, the data (0110101) is stored in the MAR 41-2 and, after that, is transmitted through the multiplexer 44 to all the memory modules 47'-0 through 47'-31 as indicated in FIG. 7(5). Since the data stored in the MAR 41-3 is (00010), the memory module 47'-2 is selected by the decoder 43-2, so that the signal TRAS1 is changed to the signal *RAS in the memory module 47'-2 as indicated in FIG. 7(6). Thus, the memory module 47'-2 is accessed by the signals MA12 through MA18 as indicated in FIGS. 7(5) and 7(6).

(3) As indicated in FIGS. 7(1), 7(4) and 8(3), the signals MA00 through MA11 (000011010011) are transmitted from the address mapper 31 of the MAC 3 to the MAR 41-1 of the memory unit 4 and, simultaneously, the control signal MSTA2 is transmitted from the control circuit 33' of the MAC 3 of the control circuit 42' of the memory unit 4. As a result, the data (000011010011) is stored in the MAR 41-1 and, after that, the higher five bit data (00001) of the MAR 41-1 is compared with the data (00010) stored in the MAR 41-3 by the comparator circuit 48. As a result of this, since the data stored in the MAR 41-3 is different from the data (00001), the comparator circuit 48 raises the potential of the signal C2, so that the control circuit 42' produces the signal TRAS2 and, after that, produces the signal TCAS. However, in the memory module 47'-2, the signals TRAS2 and TCAS are blocked by the gates G8 and G10 of FIG. 6, respectively, since the module 47'-2 is not selected by the decoder 43-1. As a result, the signal *CAS remains high, as indicated in FIG. 7(7), and accordingly, the access operation for the memory module 47'-2 is not completed. On the other hand, in the memory module 47'-1, the signal TRAS2 passes through the gates G8 and G9, so that the potential of the signal *RAS is changed from high to low, as indicated in FIG. 7(8), since the module 47'-1 is selected by the decoder 43-1. Therefore, the memory module 47'-1 is accessed by the data MA12 through MA18. After that, the signal TCAS also passes through the gate G10, so that the potential of the signal *CAS is changed from high to low, as indicated in FIG. 7(9). Simultaneously, the multiplexer 44 transmits the data MA05 through MA11 instead of the data MA12 through MA18 at time P1, as indicated in FIG. 7(5), which time is determined by a delay circuit 45 whose delay time is T2 and a control circuit 46. Therefore, the memory module 47'-1 is accessed by the data MA05 through MA11. Thus, the access operation for the memory module 47'-1 is completed. In this case, the total access time for the memory module 47'-1 is indicated by T6 in FIG. 7(9).

(4) As indicated in FIG. 8(4), the data (00001) stored in the MAR 41-1 is transmitted to the MAR 41-3. Next, the access operation for the memory module 47'-1 is again effected.

(5) As indicated in FIGS. 7(2), 7(3) and 8(2), the signals MA12 through MA18 (0110110) are transmitted from the address buffer 32 of the MAC 3 to the MAR 41-2 of the memory unit 4 and, simultaneously, the control signal MSTA1 is transmitted from the control circuit 33' of the MAC 3 to the control circuit 42' of the memory unit 4. As a result, the data (0110110) is stored in the MAR 41-3 and, after that, is transmitted through the multiplexer 44 to all the memory modules 47'-0 through 47'-31. Since the data stored in the MAR 41-3 is (00001), the memory module 47'-1 is selected by the decoder 43-1, so that the signal TRAS1 is changed to the signal *RAS in the memory module 47'-1, as indicated in FIG. 7(8). Thus, the memory module 47'-1 is accessed by the signals MA12 through MA18, as indicated in FIGS. 7(5) and 7(8).

(6) As indicated in FIGS. 7(1), 7(4) and 8(6), the signals MA00 through MA11 (000011010011) are transmitted from the address mapper 31 of the MAC 3 to the MAR 41-1 of the memory unit 4 and, simultaneously, the control signal MSTA2 is transmitted from the control circuit 33' of the MAC 3 to the control circuit 42' of the memory unit 4. As a result, the data (000011010011) is stored in the MAR 41-1 and, after that, the higher five bits (00001) of the MAR 41-1 are compared with the data stored in the MAR 41-3 by the comparator circuit 48. As a result of this, since the data stored in the MAR 41-3 is also (00001), the comparator circuit 48 raises the potential of the signal C1, so that the circuit 42' produces the signal TCAS. In the memory module 47'-1, the signal TCAS passes through the gate G10, so that the potential of the signal *CAS is changed from high to low as indicated in FIG. 7(9). Simultaneously, the multiplexer 44 transmits the data MA05 through MA11, instead of the data MA12 through MA18 at time P2, as indicated in FIG. 7(5). Therefore, the memory module 47'-1 is accessed by the data MA05 through MA11. Thus, the second access operation for the memory module 47'-1 is completed. In this case, the total access time for the memory module 47'-1 is indicated by T7 in FIG. 7(9), which is much shorter than the time T5 indicated in FIG. 3.

(7) As indicated in FIG. 8(7), the data (00001) stored in the MAR 41-1 is transmitted to the MAR 41-3.

Thus, if the higher order five bits of the MAR 41-1 are different from the data of the MAR 41-3, which was used in a previous access, the total access time, which is denoted by T6 in FIG. 7(9), is relatively long. Contrary to this, if the higher five bits of the MAR 41-1 are the same as the data of the MAR 41-3, the total access time, which is indicated by T7, is very short. In general, an executive program consists of routine programs, each of which may be stored in one memory module. Therefore, the higher order five bits of the MAR 41-1, which designate the selection of the memory modules, often coincide with those of the MAR 41-3. As a result, the average access time is nearly T7, which is very short.

As explained hereinbefore, the system for accessing memory modules according to the present invention has the advantage that the access time is very short, in other words, that the access speed is higher than that of the prior art, since before an entire current effective address is determined, the actual access for the memory modules is executed by using a part of the previous effective address.

We claim:

1. A system for accessing memory modules by using an effective address composed of first, second and third parts, the first and second parts being determined later than the third part, comprising:

a first means for storing the first and second parts of a current effective address;

a second means for storing the third part of said current effective address;

a third means for storing the first part of the previous effective address;

fourth means for comparing the first part of said current effective address stored in said first means with the first part of said previous effective address stored in said third means when the first and second parts of said current effective address are determined; and fifth means responsive to said first, second, third, and fourth means for accessing said memory modules by using the first part of said previous effective address stored in said third means and the third part of said current effective address stored in said second means to initiate an access before the first and second parts of the current effective address are available, said fifth means additionally comprising means for completing the access after the first and second parts of the current effective address are available by using the second part of said current effective address stored in said first means if the first parts of said previous and said current effective addresses are determined to be the same as each other by said fourth means, and for accessing another module by using the first and second parts of said current effective address stored in said first means and the third part of said current effective address stored in said second means if the first parts of said previous and said current effective addresses are determined to be different from each other by said fourth means.

2. A system as set forth in claim 1, further comprising a multiplexer means for transmitting the third part of said current effective address stored in said second means and the second part of said current effective address stored in said first means to said memory modules time-divisionally.

3. A system as set forth in claim 1, wherein the first part of said effective address designates the selection of said memory modules and the second and third parts of said effective address designate the selection of memory cells in each of said memory modules.

4. A system as set forth in claim 3, wherein said fifth means further comprises:

a first decoder means for decoding the first part of said current effective address stored in said first means, so as to select one module from said memory modules; and a second decoder means for decoding the first part of said previous effective address stored in said third means, so as to select one module from said memory modules.

* * * * *

UNITED STATES PATENT AND TRADEMARK OFFICE
CERTIFICATE OF CORRECTION

PATENT NO. : 4,384,342

DATED : May 17, 1983

INVENTOR(S) : Imura et al.

It is certified that error appears in the above-identified patent and that said Letters Patent is hereby corrected as shown below:

Front page, [75] Inventors, "Yamato" should be
        --Atsugi--.

Front page, [56] References Cited, "364/90" should be
        --364/900--.

Front page, "Stass & Halsey" should be --Staas & Halsey--.

Col. 3, lines 40 and 42, "syncronization" should be
        --synchronization--.

Col. 4, line 19, "pontentials" should be --potentials--;
        line 57, after "are" insert --emitted--;
        line 59, after "are" insert --emitted--.

Signed and Sealed this

Sixth Day of March 1984

[SEAL]

Attest:

GERALD J. MOSSINGHOFF

Attesting Officer    Commissioner of Patents and Trademarks